Patented Dec. 5, 1933

1,937,527

UNITED STATES PATENT OFFICE 1,937,527

MILK PRODUCT

Herbert E. Otting, Westerville, Ohio, assignor to M & R Dietetic Laboratories, Inc., a corporation of Ohio No Drawing. Application August 29, 1931
Serial No. 560,241

8 Claims. (Cl. 99—5)

The present invention relates to improvements in milk products and will be fully understood from the following description.

The object of the present invention is to produce a milk or milk product particularly adapted to the feeding of infants and individual adults. In a milk or milk product suitable for infant and individual adult feeding, it is desirable that the product, as prepared and supplied, be of substantially constant and uniform composition and at the same time of such character that it is possible for the user to readily modify the fat content of the milk. At the same time, it is advantageous that the digestibility of the milk or milk product be further increased by removal of part of the phosphate and/or calcium ion content thereof. On the other hand, it may in individual instances be desirable to increase the fat content of the milk while lowering the calcium and/or phosphate ion content thereof.

One of the advantages previously possessed by undesiccated milk over desiccated milk and particularly over spray dried milk, has been that, in the undesiccated milk a high fat layer, or cream, forms as a separate and distinct body of material and floats upon the remainder of the milk, whereas this is not true of desiccated and particularly spray dried milk which has been brought up to its former composition by the addition of water. It is believed that this is due to the fact that the fat globules of spray dried milk have fat impervious coatings which prevent the blending of the fat and the separation and aggregation or concentration of the fat particles. The presence of the two bodies of material in milk, separated by what is commonly known as a cream-line, is of advantage not only as an inducement to the purchase of such milk owing to the custom of purchasers to find such a cream-line, but particularly in that it permits the fat content of the whole milk to be readily, easily and accurately altered to any desired percentage between the percentage of fat contained in the upper and that contained in the lower layer, by the removal of part or all of one or the other layer and re-mixture of the remainder. By the use of a dried milk product, capable, on mixture with water, of forming a liquid product which forms such a cream line or separate body of fat material, the milk or milk product is readily adapted to any required modification of its fat content for the feeding of infants and individual adults; and by modification of the calcium and phosphate as well as the fat content, there is placed in the hands of the user a product which not only is uniform but is readily capable of adaptation to individual requirements.

In accordance with the present invention, I produce a spray-dried milk powder product which, upon admixture with water, forms a liquid that on standing develops a separate body of high fat liquid or cream situated upon a liquid body low in fat content and separated from the cream by a cream line.

For example, a product may be prepared in accordance with the present invention by separately spray drying a low fat milk fluid, having a reduced $P_2O_5$ or Ca ion content or both, the fat content thereof not being in excess of that of normal whole milk, and a cream or milk fluid having a fat content of at least 7.5% and probably 18% or higher, the general procedure employed being, for example, as described in my prior application Serial No. 454,520, filed May 21, 1930 issued as Patent No. 1,882,028 of October 11, 1932 and Ser. No. 467,956, filed July 14, 1930. The separately spray dried products are blended or mixed to secure a final product of the desired fat and total solid ratios. The resulting blended products, on thorough admixture with water and setting, tends to form a cream line; that is, to separate into an overlying layer of higher fat content and a lower layer of lower fat content, although, as pointed out hereinafter, the tendency to the formation of a cream line and the said separation may be further improved.

In general, in carrying out the present invention, I prefer to employ separated cream and skim milk derived from whole cow's milk as the components subjected to separate spray-drying. The whole milk, or the separated skim milk, is treated to reduce its calcium or phosphate ion content, or both preferably, by contacting it while in a slightly acidified condition with a base-exchange silicate, such as glauconite, as described in the prior application of John F. Lyman, Serial No. 500,981, filed Dec. 8, 1930, or with a normally inert, adsorptive material, such as silica gel, hydrated silica, fuller's earth, or Florida clay, which has been previously activated by successive treatments with a caustic alkali and an alkali halide. If whole milk is so treated, it may be employed as the low-fat component to be subjected to spray drying, or may be separated and the resulting skim milk used as the low-fat component. The cream and the low fat component (as whole milk or preferably skim milk) thus produced, are then separately desiccated by spray drying, (for example as set forth in my application Serial No. 454,520, filed May 21, 1930 issued as Patent No. 1,882,028 of October 11, 1932) and the resulting powders are intimately mixed in such proportions as to form a milk powder having the desired fat and total solid content and preferably substantially the fat content of a milk powder formed from whole milk. This mixture may, if desired, be accomplished by simultaneous spraying in the manner set forth in my prior application, Serial No. 467,956, filed July 14, 1930. The resulting product, upon thorough admixture with water and standing, will be found to form a cream line.

Skim milk may vary in its proportion of CaO from 0.181% to 0.290% with an average of about 0.201%; and may vary in its proportion of $P_2O_5$ from 0.221 to 0.273%, with an average of approximately 0.25%. In whole milk the calcium and phosphate ion content is slightly less, due to the increased fat content. The average CaO content in whole milk ranges from about .173% to .280%, with an average of .193%, and the $P_2O_5$ content ranges from about .212% to .262%, with an average of about .240%. The CaO and $P_2O_5$ content are preferably lowered by treatment of the whole or skim milk, while maintained in slightly acid state, with a suitable base-exchange silicate, such as glauconite, permutit, or the like, as set forth in the application of John F. Lyman, Serial No. 500,981 filed December 8, 1930, or by treatment with a normally inert, adsorptive material, such as silica-gel, which has been activated by successive treatments with a caustic alkali and an alkali metal halide, as set forth in my copending application, Serial No. 560,242, filed of even date herewith. The use of such ion-exchange compounds is particularly desirable in that effective removal of phosphate or calcium ions or both is secured by a simple contact process, without modification of other constituents of the milk fluid, the extent of removal being controlled by the proportions of ion-exchange compound. Other methods of securing a desired reduction of phosphate and lime ratios may, of course, be employed. In general, it is desirable to reduce the CaO content to below 0.130% and the $P_2O_5$ content to below 0.205%.

In the event that it is desired to remove only the phosphate ion, such result may be accomplished by saturating the base exchange silicate or activated adsorptive material with calcium iron or aluminum ions by washing with a solution of a soluble and ionizable salt of these metals prior to treatment of the milk, or the same result may be obtained by revivifying spent base-exchange silicate or adsorptive material by the use of a caustic alkali only.

If it is desired to remove only the calcium ion the base-exchange silicate or the activated adsorptive material may, prior to treatment of the milk herewith, be saturated with phosphate ions by washing with a solution of a soluble and ionizable phosphate. The same result may be accomplished by revivifying the spent base-exchange silicate or adsorptive material with an alkali halide only.

As a specific example of an operation in accordance with my invention, I may proceed as follows:

Upon separation of whole milk into cream of about 20% fat content, for example, and skim milk, 600 cc. of the skim milk having a CaO content of approximately 0.1918% and a $P_2O_5$ content of approximately 0.2405% was raised to 0.26% acidity (calculated as lactic acid) by the addition of hydrochloric acid, and was then contacted with 400 grams of activated silica gel. The milk, after passage through the silica gel, dropped to .06% acidity and was raised to .23% with hydrochloric acid and passed through the silica gel a second time. After the second passage the milk showed a .05% acidity and did not curdle when tested with rennet. Upon analysis it showed a removal of 0.0710% of calcium oxide and .0788% of $P_2O_5$, or a residue content of 0.1208% of the CaO and 0.1617% $P_2O_5$, calculated upon the original concentration of the skim milk. The activated silica gel was secured by moistening 200 parts by weight of silica gel with an equal amount of water, contacting with a solution of 5 parts of sodium hydroxide in 200 parts of water, and then washing thoroughly with water; 15 parts of sodium chloride dissolved in 100 parts of water was then poured through the silica gel and the gel again well washed with water.

The resulting cream and the treated skim milk were then separately spray dried, producing respectively a cream powder having a content of approximately 72% of fat, and a powdered skim milk having a fat content of approximately 2.85%. 4.22 lbs. of the cream powder and 6.78 lbs. of the skim milk powder were intimately mixed and produced a product containing approximately 32% of fat. 30 grams of the product mixed with 220 cc. of water at 50° F., gave a milk product containing 3.84% fat. Upon standing a cream line developed, the cream content being approximately 17% of the whole as compared with 15 to 16% in ordinary pasteurized milk. The cream layer upon analysis was found to contain approximately 12% fat and the lower layer 1.4% fat. It is apparent that the fat content of such milk product could be readily altered, by the removal of the cream or skim milk layer, to any desired percentage between 1.4 and 12%.

In the preparation of a desiccated milk product in accordance with the present invention, a further improvement in the tendency to develop a "cream line" on admixture of the dried product with water and standing may be secured by increasing or building up the content of non-fat solids above that normally found in a separated cream of similar fat content. This may be accomplished, for example, by producing initially a cream having a higher fat content than is desired in the high-fat component ultimately subjected to desiccation and adding to it milk fluids or milk products high in non-fat solids, such as skim milk, condensed skim milk, whey, condensed or evaporated whey and the like, such products being low in fat and the proportions thereof used being such that the ultimate material has the desired fat content and the desired, increased proportion of non-fat solids. It is advantageous to homogenize the resulting product, preferably at a pressure not in excess of two thousand pounds, say at 1700 pounds.

For example, a typical 20% cream contains in addition to 20% of butter fat, approximately 7.16% of non-fat solids. To prepare a high fat component for use in accordance with the present invention, having the same percentage of butter fat but an increased percentage of non-fat solids, I may proceed as follows.

A 40% cream is prepared by the usual separation process from cow's milk. To 249 lbs. of such cream I add 166 lbs. of a skim milk containing 9% total solids (0.12% butter fat) and 83 lbs. of a concentrated or evaporated skim milk which has been brought to a total solid percentage of 34. The resulting mixture will very closely approximate 20% in butter fat content and on thorough intermixture and desiccation to a powder containing, say, about 0.5 to 0.6% moisture, the dried product will contain about 56 to 56.2% butter fat and 43.5 to 43.2% non-fat solids. The normal cream, above referred to, on desiccation to approximately the same water content, will produce a product containing about 72% butter fat and about 27.5% non-fat solids. It will be appreciated that these figures are subject to the usual variations found in normal milk products. In general, I find it desirable to build up the proportion of non-fat solids in the high fat component, before it is subjected to desiccation, to a point at least double that which would be present in a separated cream of high fat content.

The high fat product thus formed is preferably homogenized at a pressure not in excess of two thousand pounds and desiccated, suitably by the spray drying process, and is admixed with a spray dried low fat milk fluid such as whole milk, or skim milk, suitably desiccated as by spray drying. For example, 5 lbs. of the dried powder resulting from desiccation of the above high fat component admixed with 4.09 parts of desiccated skim milk result in a product containing 33.4% fat. 30 grams of the latter admixed with 220 cc. of water yields a milk fluid containing 3.95% fat and 11.64% total solids which, on standing, separates out a supernatant layer of cream amounting to 17% of the whole and containing 12% fat, the lower layer containing 1.4% fat. It is obvious that such a product may be used, particularly for feeding purposes, in the same manner as whole milk and may be modified as to its fat content as hereinbefore described. It will likewise be readily apparent that the milk fluids blended with the high fat component before desiccation thereof may have their lime and phosphate content reduced as hereinbefore described; or the lime and phosphat content of the low fat component may be reduced before desiccation in order to produce a final product having the valuable properties, particularly with respect to formation of small curds on digestion, characteristic of the products of reduced lime or phosphate content, as hereinbefore fully set forth.

It is likewise readily apparent that in the formation of desiccated milk products in accordance with the present invention, any desired constituents not normally present in milk may be incorporated, as is customary in the preparation of products for dietary purposes. For example, a portion of the fat content of the products subjected to treatment may be replaced by other fats than butter fats, such as olein, vegetable oils, or the like; or particular oils, such as cod liver oil may be incorporated in or substituted for butter fat in the products subjected to treatment. Additional desirable solids, such as lactose, starch preparations, or the like may be incorporated in the final product, preferably by dissolving them in one or the other of the components subjected to desiccation in accordance with the process hereinbefore described.

I claim:

1. In the preparation of a desiccated milk product capable of forming an emulsion with water which will develop a cream line, adding to a normal high-fat liquid milk product a portion of non-fat milk solids to form a product higher in fat content than normal milk in which the proportion of non-fat to solids is substantially higher than in a normal milk product of the same fat content, desiccating the resulting mixture, separately desiccating a normal low-fat milk product and admixing the resulting desiccated products.

2. In the preparation of a desiccated milk product capable of forming a mixture with water which will develop a cream line, adding to a normal high-fat liquid milk product a portion of non-fat milk solids to form a product having a fat content exceeding 7.5%, in which the proportion of non-fat solids is substantially higher than in a normal milk product of the same fat content, spray drying the resulting mixture, separately spray drying a normal low-fat milk product and admixing the resulting desiccated products in proportions to form a mixture in which the ratio of fat to solids is substantially that of whole milk.

3. In the preparation of a desiccated milk product capable of forming a mixture with water which will develop a cream line, adding to a cream of about 40% fat content sufficient milk solids at least partly in the form of concentrated skim milk to form a product of about 20% fat content with a substantially higher proportion of non-fat solids than that of normal 20% cream, homogenizing and spray drying the resulting mixture, separately spray drying skim milk and admixing the resulting spray dried products to form a mixture having substantially the fat to solid ratio of normal milk.

4. In the preparation of a desiccated milk product capable of forming a mixture with water which will develop a cream line, adding to a normal high-fat liquid milk product a portion of non-fat milk solids to form a product of at least 7.5% fat content in which the proportion of non-fat to solids is substantially higher than in a normal milk product of the same fat content, thoroughly intermixing and spray drying the resulting mixture, separately spray drying a low-fat liquid milk product of reduced calcium and phosphate content and admixing the resulting spray dried products.

5. A desiccated milk product comprising an intimate admixture of a separately spray dried milk product of original fat content exceeding 7.5% and in which the proportion of non-fat solids is substantially higher than in a normal milk product of the same fat content with a separately desiccated milk product of lower-fat content than whole milk, whereby the resulting product is capable of forming a cream line on intimate admixture with water and standing.

6. A substantially water-free milk product having fat and solids in approximately the proportions found in whole milk comprising a spray dried high-fat constituent having a ratio of fats to total solids of about 20:34 with spray dried skim milk, the mixture, on commingling with water and standing, being capable of forming a cream line.

7. A desiccated milk product having substantially the proportion of fat to solids found in normal whole milk but with reduced calcium and phosphate content comprising an intimate mixture of a constituent in which the proportion of fat is higher than that in whole milk and the proportion of non-fat solids is substantially higher than that in a normal high-fat liquid milk product of the same fat content with a separately spray dried skim milk having a reduced calcium and phosphate content, the mixture being capable of forming a cream line on commingling with water and standing.

8. A dry milk product comprising commingled, separately spray dried milk products, one containing about 56–56.2% butter fat and 43.5–43.2 non-fat solids and the other being a skim milk of reduced calcium and phosphate content, the admixture having the property of forming a cream line on commingling with water and standing.

HERBERT E. OTTING.